US010747812B1

(12) United States Patent
Fang et al.

(10) Patent No.: US 10,747,812 B1
(45) Date of Patent: Aug. 18, 2020

(54) VIDEO ANALYTICS

(71) Applicant: EMC IP Holding Company LLC, Hopkinton, MA (US)

(72) Inventors: ChunSheng Fang, Redwood City, CA (US); Yu Cao, Beijing (CN); Xiaoyan Guo, Beijing (CN); Jun Tao, Shanghai (CN); Zhe Dong, Beijing (CN); Sanping Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 611 days.

(21) Appl. No.: 14/613,640

(22) Filed: Feb. 4, 2015

Related U.S. Application Data

(60) Provisional application No. 62/058,429, filed on Oct. 1, 2014.

(51) Int. Cl.
*G06F 16/738* (2019.01)
(52) U.S. Cl.
CPC ................... *G06F 16/738* (2019.01)
(58) Field of Classification Search
CPC .................................................. G06F 17/3084
USPC .......................................................... 707/723
See application file for complete search history.

(56) References Cited

U.S. PATENT DOCUMENTS

| | | | | |
|---|---|---|---|---|
| 2007/0180106 A1* | 8/2007 | Pirzada | ............ | H04N 21/64738 709/224 |
| 2009/0016599 A1* | 1/2009 | Eaton | .................... | G06N 20/00 382/159 |
| 2009/0254948 A1* | 10/2009 | Middleton | ......... | H04N 7/17318 725/62 |
| 2014/0321302 A1* | 10/2014 | Fan | .................... | H04W 52/0277 370/252 |
| 2015/0019614 A1* | 1/2015 | Pierre-March | .......... | H04L 67/10 709/201 |
| 2015/0082203 A1* | 3/2015 | James | .............. | H04N 21/23418 715/756 |
| 2015/0128162 A1* | 5/2015 | Ionescu | .............. | H04N 21/6125 725/14 |
| 2015/0150062 A1* | 5/2015 | Guerrera | .............. | G11B 27/031 725/95 |
| 2015/0278245 A1* | 10/2015 | Sagar | ................. | G06F 17/30174 707/610 |
| 2015/0290808 A1* | 10/2015 | Renkis | ................... | H04N 7/181 700/257 |
| 2015/0296186 A1* | 10/2015 | Renkis | ................... | H04N 7/181 348/159 |

(Continued)

*Primary Examiner* — Pierre M Vital
*Assistant Examiner* — Alicia M Antoine
(74) *Attorney, Agent, or Firm* — Ryan, Mason & Lewis, LLP

(57) ABSTRACT

A method, system and computer program product for performing video analytics on content, by collecting content (video data) from a plurality of sources, wherein the content pursues a streaming protocol; and performing at least one of storing the content in a local repository for downtime recording wherein on negative determination of a network connection, wherein servers directly coupled to a plurality of sources cache content until the network connection retains normalcy or performing analytics at least one of a real-time insight or an interactive insight or a batch insights on the content, and displaying to the user a resulting insight wherein the resulting insights are in a human readable form.

21 Claims, 4 Drawing Sheets

(56) References Cited

U.S. PATENT DOCUMENTS

2015/0341812 A1* 11/2015 Dion ................... H04W 24/08
                                                370/252
2015/0358581 A1* 12/2015 Zhou ...................... H04N 7/15
                                                348/14.07
2016/0065419 A1*  3/2016 Szilagyi .............. H04L 41/5067
                                                709/224

* cited by examiner

VIDEO ANALYTICS

RELATED APPLICATION

This application claims priority from U.S. Provisional Patent Application No. 62/058,429, titled "Video Analytics on Data Lake" filed on Oct. 1, 2014, the contents of which are hereby incorporated in entirety by reference.

FIELD OF TECHNOLOGY

The disclosure relates generally to video analytics.

BACKGROUND

A portion of the disclosure of this document may contain command formats and other computer language listings, which are subject to copyright protection. The copyright owner has no objection to the facsimile reproduction by anyone of this document or the disclosure itself, as it appears in the Patent and Trademark Office patent file or records, but otherwise reserves all copyright rights whatsoever. EMC and PIVOTAL are registered trademarks of the respective companies in the US and other countries.

Computer systems are constantly improving in terms of speed, reliability, and processing capability. As generally known, computer systems process and store large amounts of data in communication with a shared data storage system where the data is stored. The data storage system may include one or more storage devices, usually of a fairly robust nature and useful for storage spanning various temporal requirements, e.g., disk drives.

Data may be hosted in a data lake, which is a storage repository that holds a vast amount of raw data in its native format until it is needed. While a hierarchical data warehouse stores data in files or folders, a data lake uses a flat architecture to store data and therefore is very complex in nature, and typically consists of structured data, unstructured data and a combination thereof. Companies that sell data storage systems and perform analytics on data lakes and the like are concerned about providing customers with efficient information on the data stored in such huge data storages, and doing so at an optimal cost benefit to the clients and the service providers.

SUMMARY

Embodiments of the present disclosure may be methods, systems and computer program products for performing video analytics on content by collecting content (video data) from a plurality of sources, wherein the content follows a predefined streaming protocol; and storing the content in a local repository for downtime recording, and wherein on negative determination of a network connection, end points cache content until the network connection retains normalcy. Other embodiments are also disclosed.

BRIEF DESCRIPTION OF THE DRAWINGS

Objects, features, and advantages of embodiments disclosed herein may be better understood by referring to the following description in conjunction with the accompanying drawings. The drawings are not meant to limit in any way the scope of the claims included herewith. For clarity, not every element may be labeled in every figure. The drawings are not necessarily to scale, emphasis instead may be placed upon illustrating embodiments, principles, and concepts.

Thus, features and advantages of the present disclosure may become more apparent from the following detailed description of exemplary embodiments thereof taken in conjunction with the accompanying drawings in which.

Figure 1:
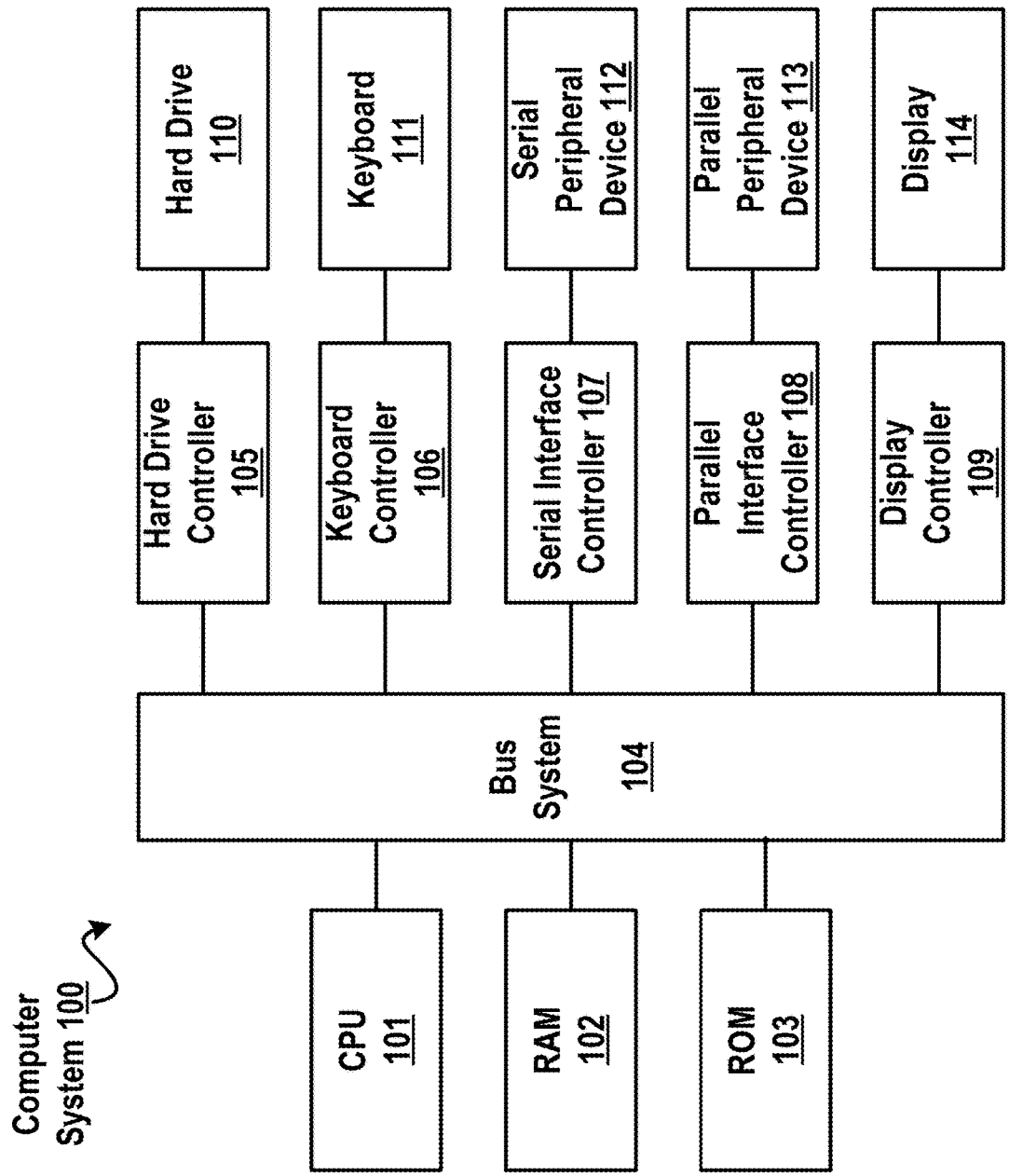
FIG. 1 schematically illustrates a block diagram of an exemplary computer system 100, in accordance with an embodiment of present disclosure.

It may be noted that the flowcharts and block diagrams in the figures may illustrate the apparatus, method, as well as architecture, functions and operations executable by a computer program product according to various embodiments of the present disclosure. In this regard, each block in the flowcharts or block diagrams may represent a module, a program segment, or a part of code, which may contain one or more executable instructions for performing specified logic functions. It should be further noted that in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

DETAILED DESCRIPTION

Some embodiments will be described in more detail with reference to the accompanying drawings, in which these embodiments of the present disclosure have been illustrated. However, embodiments of the present disclosure can be implemented in various manners, and the description should not be construed as a limitation of the embodiments disclosed herein. On the contrary, these embodiments, though exemplary in nature, may be provided for a thorough and complete understanding of the present disclosure, and conveying the scope of the present disclosure to those skilled in the art.

Embodiments of the present disclosure may provide a method, a computer program product and an apparatus or system, which may ameliorate deficiencies related to processing video data; and it would be beneficial to have efficient ways of performing analytics on data and specifically on a data lake and providing customers/users with the right and appropriate information.

Embodiments of the present disclosure relate to a system, computer program product and a method for performing video analytics on content by collecting content (video data) from a plurality of sources, wherein the content follows a predefined streaming protocol; and performing at least one of storing the content in a local repository for downtime recording wherein on negative determination of a network connection, a server directly coupled to a plurality of sources is configured to cache content until the network connection retains normalcy and/or performing analytics at least one of a real-time insight or an interactive insight or a batch insights on the content (hereinafter also referred to as data), and displaying to the user a resulting insight, the insights arising from the analytics on the data and the resulting insights are in a human readable form.

A further embodiment includes classifying and segregating the content collected from the plurality of sources into being at least one of a real time source or a micro batch source or a batch source, wherein the segregation involves arranging the content collected based on a set of pre-defined rules or user defined rules. Yet a further embodiment includes processing using video analytics the content collected based on the segregated category to obtain processed content. Yet a further embodiment includes the content collected that originates from at least one of a real time streaming source or a file format source or a third party data source.

A further embodiment includes detecting any anomalies in the collected content in at least one of an offline mode and/or an online mode by comparing with at least one of the stored content in other repositories or real-time streaming content, wherein the repositories can include data lakes. Yet a further embodiment includes processing using video analytics being performed at least in one of a computer memory for real time analytics or in a file system repository for large-scale big data analytics.

A further embodiment includes checking other repositories on a worldwide network for similar content; performing a match with the collected content; and providing the user with a ranked list of results matching the collected content.

In yet a further embodiment the analytics comprises performing at least one of detection and/or recognition and/or indexing and/or summarization and/or retrieval and/or matching biometrics for the collected content with a sample content; compressing the content collected; generating areas of interest in the content collected; detecting any anomalies in the content collected; and detecting relevant details, as per one or more user/customer requirements or prerequisite criteria or both, with respect to the sample content.

Reference is now made to the example embodiment of FIG. 1, which illustrates an exemplary computer system 100 in accordance with an embodiment of the present disclosure. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 may be coupled to the System Bus 104. Hard Drive 110 may be coupled to Hard Drive Controller 105. Keyboard 111 may be coupled to Keyboard Controller 106. Serial Peripheral Equipment 112 may be coupled to Serial Interface Controller 107. Parallel Peripheral Equipment 113 may be coupled to Parallel Interface Controller 108. And, Display 114 may be coupled to Display Controller 109. It should be understood that the structure as illustrated in FIG. 1 may be only for exemplary purposes rather than any limitation to the present disclosure. In some cases, some devices may be added to or removed from the computer system 100 based on specific situations. Other digital computer architectures may also be employed.

Figure 2A:
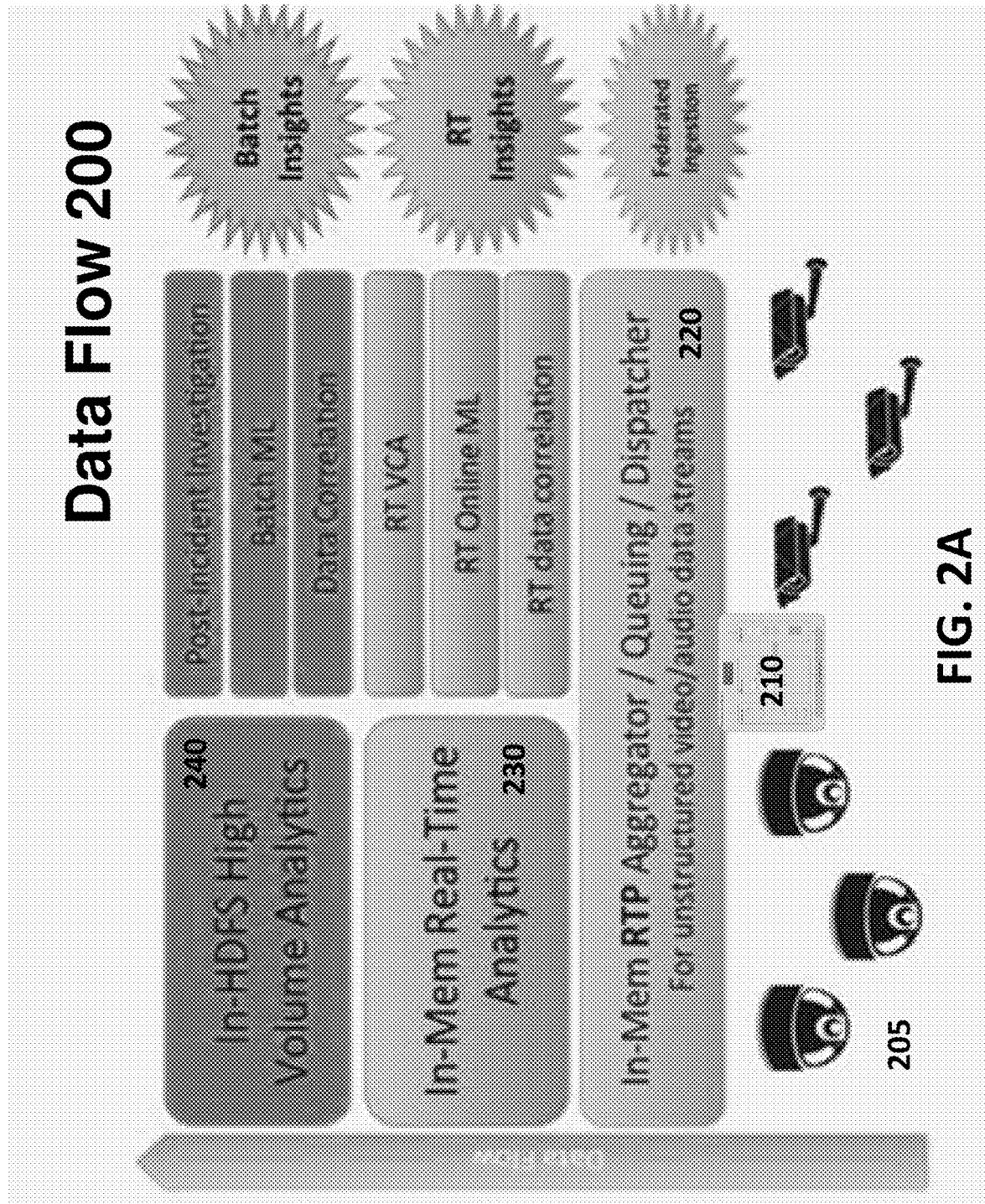
FIGS. 2A and 2B illustrate exemplary architectures of data flow in accordance with an embodiment of the present disclosure.

Reference is now made to FIG. 2A, wherein embodiments of the present disclosure illustrates a data flow that may be related to a general framework and core functionalities of performing video analytics on data. FIG. 2A illustrates an exemplary architecture, and this illustration should not be considered as a limitation on the architecture, and there could be various other representations or embodiments that could replicate the end result of the architecture made under the present disclosure and such architectures would fall within the scope of the present disclosure.

As illustrated in the exemplary embodiment of FIG. 2A, input devices 205 may be configured to pick up input data (hereinafter also referred to as input signal or data), for example such input data in one embodiment being video signals. Input devices 205 may be configured to capture videos, which will be the input in real time, wherein the input signal may be in any of various available formats. In one embodiment, the input signals, i.e., the video stream format may follow different real time protocols such as MJPEG, H264, MPEG, RTSP, etc., or may even be a proprietary format, and in one embodiment these input signals may consist of streaming packets that may have a variety of possible bit rates. In many embodiments, the input signal may comprise various different video file formats, and may follow different compression standards, e.g., H264, MPEG, a Proprietary format, etc., and the signals may also be considerably large volume files, for example on the order of gigabytes or terabytes.

In various embodiments, input devices also referred to as networked cameras 205 or IP cameras or other network devices are capable of collecting video data, and transmit it over the network, and such video data may normally generate relatively high data traffic or data rate traffic. In certain embodiments, data from IP cameras 205 may be transferred to a central location that may be hosting a data server by use of an appropriate transmission protocol, for example a RTP (Real-time protocol) transfer, etc. In one embodiment, data that is captured from IP cameras 205 may be directly transmitted to one or more data servers, which may be located either proximate to the location of the IP cameras or in one embodiment the data servers may be located at different locations, from the location of the IP cameras. In some embodiments, the IP cameras that collect data may be connected to the data servers by means of a network. In a given embodiment, connection from IP cameras to the data servers via the network may be a complete wired connection or a complete wireless connection or a combination thereof of wired and wireless connections.

In most embodiments, IP cameras may follow a federated structure for ingestion of the data (discussed below) wherein IP cameras 205 may be located at different geographical locations (geo-locations), or may belong to different organizations/communities, and all of these IP cameras located at different geo-location and/or different organizations/communities may be virtually mapped and managed from a single location. In some embodiments, cameras interfaced for the purpose of video data collection may also fall within the scope of this invention, for example thermal cameras, etc. In some other embodiments analog cameras may also be configured to perform the tasks assigned above of collecting data and then transmitting the data to the data servers, for example suing the federated structure for ingestion of the data. In one embodiment there may be a mix of IP cameras and/or analog cameras and/or other types of cameras capable of collecting data that may be collectively coupled to the data servers.

IP camera 205 set up at the various geo-locations and at the various organizations may be configured to collect the data, for example in one embodiment may be specifically configured for collecting data related to surveillance, and collection of surveillance data is only an exemplary embodiment and this should not be construed as a limitation on the present disclosure.

In one embodiment, the input signal from the source may comprise various formats such as video streams, video files and other forms of correlated data. In a further embodiment, the inputs signal (data stream/data), i.e., the video data or the video streams, once captured by input devices 205, are transmitted to an ingestion system 210 (also referred to as a video ingestion system).

In one embodiment, the input signal may be stored in a local repository or a data lake for downtime recording wherein on negative determination of a network connection, i.e., when the connection has abruptly terminated, a server that is directly coupled to the source, i.e., the IP camera, is configured to cache the input signal (data/content) until it is detected that the network connection has returned to its normal state. In yet a further embodiment, analytics may be performed to obtain at least one of a real-time insight or an interactive insight or a batch insights on the data. In a further embodiment resulting insight are displayed to a user, the insights arising from the analytics on the data and the resulting insights preferably being in a human readable form.

In one embodiment, the data/content collected from the plurality of sources can be classified and segregated into being at least one of a real time source or a micro batch source or a batch source, wherein the segregation involves arranging the content collected based on a set of pre-defined rules or user defined rules. In one embodiment a set of pre-defined rules for classifying and segregating data may be included at the source or the user may be provided with an option to define rules to classify and segregate the data.

Figure 2B:
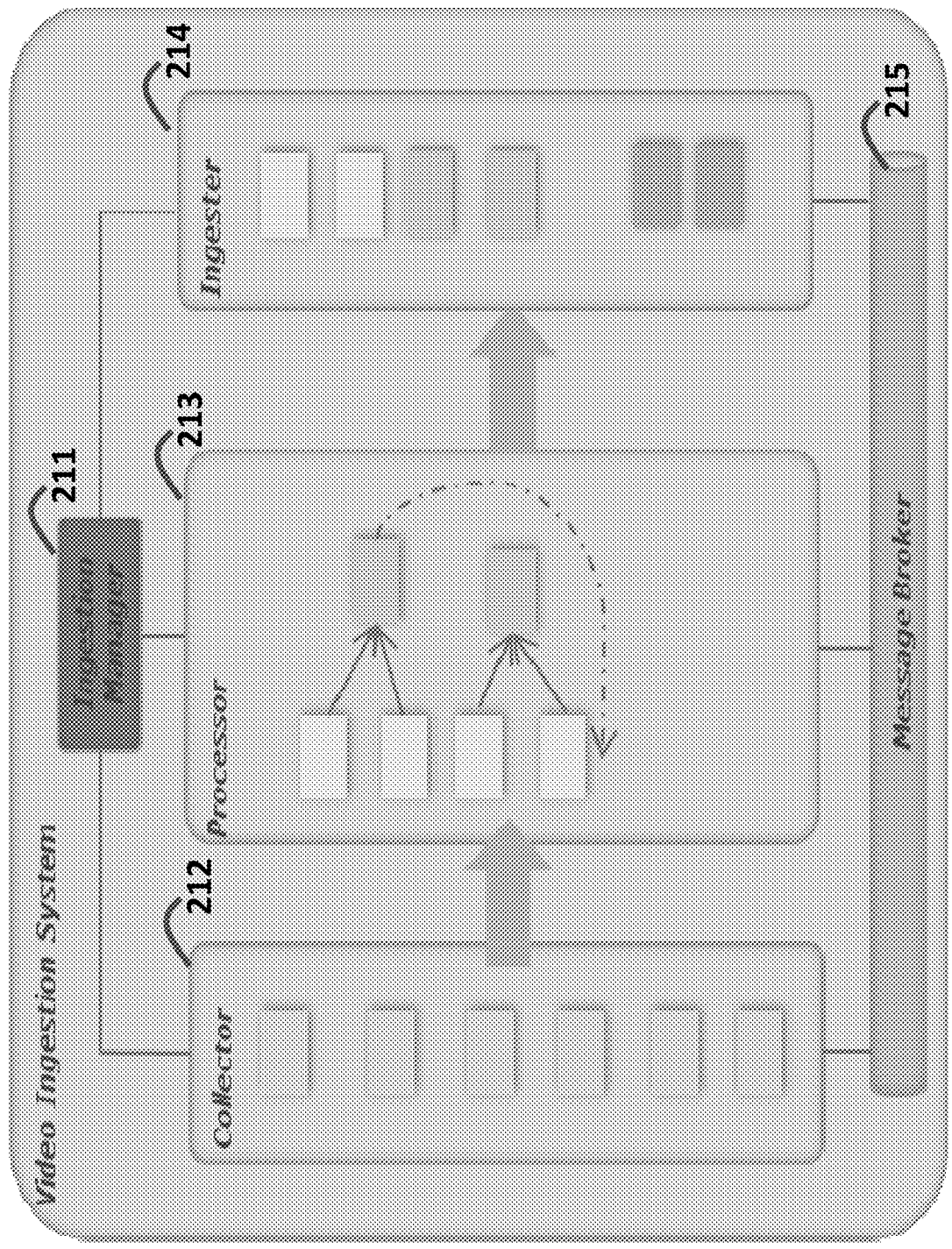

In one embodiment, ingestion system 210, as illustrated in exemplary FIG. 2B, includes several components such as an Ingestion Manager 211 that manages various components of ingestion system 210, such as collector 212, processor 213, ingester 214 and message broker 215. In one embodiment, several other components may be added to the ingestion system, and ingester 214 as illustrated should not be construed to be a limitation on the present disclosure.

In an embodiment, ingestion system 210 is coupled to the input system 205, and ingestion manager 211 controls the functioning of the various modules within ingestion system 210. In the embodiment illustrated, ingestion system 210 comprises three different modules, collector 212, processor 213 and ingester 214. In other embodiments, there may be a number of other modules added to ingestion system 210, for the purpose specified in the present disclosure of collecting data and classifying data. In one embodiment, ingestion manager 211 may be configured for managing the topology of the different modules, registration of the different modules, launching jobs/tasks, checking for availability of network, servers, other modules in the ingester, checking for load balancing, checking for fault tolerance, etc.

Collector 212 collects the input data, which can also be termed raw data, e.g., the video signal from IP camera 205, and ingestion manager 211 sends the raw data collected for processing to a processor 213. After processing the raw data, the processed data is classified into different categories, such as real time data, micro-batch data and batch data, and then sent to ingester 214 for further processing of the data as may be deemed appropriate in accordance with the embodiments of the present disclosure. In one embodiment, message broker 215 in ingestion system 210 may be used for data communication between the different modules in ingestion system 210 via messaging middleware. In various example embodiments, the message broker may be RabbitMQ. In other embodiments, other message brokers may be used to achieve similar results and all such message brokers achieving similar results would fall within the scope of the present disclosure.

In the embodiment disclosed above, a classification of data into various categories may in general allow for more accurate and better processing of the data. In one embodiment, ingestion system 210 may be configured to process data by sending the data for video analytics processing in real time or in another embodiment may send the data to storage in the network, which storage may be a data lake.

Reference is now made back to FIG. 2A, where, in one example embodiment, a video stream may be collected from a campus camera and the data may be ingested into a data storage such that it may be pipelined for real time analytics. In another embodiment, data in the form of a video file may be received from a remote site and this file may be ingested into data storage for batch processing. In yet another embodiment, there may be third party data on which correlated analytics may be performed. Ingestion system 210 may be configured to receive/collect data, appropriately process the data and then transmit the data for further processing, such as performing analytics.

Upon processing the data in ingestion system 210, ingestion system 210 may transmit the data into an ingester grid (not shown in the Figure) and then queue the processed data for further processing, such as performing analytics. In many embodiments, video frames may be queued for real time analytics to be performed, and in one embodiment raw data may be sent for example for Hadoop Distributed File System (HDFS) processing in a massive parallel processing (MPP) system.

In one embodiment, with reference to FIG. 2A for purpose of illustration, data may be stored in a single data lake platform, and the data stored in the data lake may meet different Service Level Agreements (SLAs), which for example may be based on various parameters including low latency, data volume, etc. It should be noted that this may not be an exhaustive list of parameters and a user may identify and may add a number of other parameters that could be vital for performing video analytics, for example on a data lake as part of the SLA, all such parameters would fall within the scope of the present disclosure.

In one embodiment, ingestion system 210 queues data either for in-memory processing and/or for compaction using Hadoop and/or Massive Parallel Processing (MPP) techniques. In this embodiment, in-memory RTP (real time processor) 220 can perform real time analysis on the data, i.e., the input data that is processed at ingestion system 210 may need to be analyzed for the purpose of decision-making using such analytics. As illustrated in FIG. 2A, in an embodiment, in-memory RTP 220 comprises an aggregator and/or queuing module and/or dispatcher and/or video-decoder for the purpose of processing unstructured video/audio data streams. In an example embodiment, this may be implemented using a distributed messaging framework such as RabbitMQ and/or an orchestration framework like Spring XD, or a scalable high throughput webserver such as Nginx. These exemplary embodiments are only illustrative in purpose and should not be construed to be a limitation on the embodiments of the present disclosure, and various other frameworks may also be used to achieve the same results desired and all such frameworks should fall within the scope of the present disclosure.

Referring again to FIG. 2A, in one embodiment, real time data aggregator, which is a part of in-memory real time aggregator/queuing/dispatcher 220 (hereinafter also referred to as RTAQD), may either be a software agent or a hardware element or may be combination thereof of a software agent and hardware element or may be a firmware, that may be used to pull data out from the source (IP camera 210) and organize the data that is obtained from the source into a structured format. In a further embodiment, RTAQD may be configured for consolidating and correlating multiple sources and/or for multiplexing videos.

In one embodiment, in RTAQD 220, real time data queuing may be a software component or a hardware element or a combination thereof that may be configured to queue the data packets from one or multiple sources. In a further embodiment RTAQD 220 may be further configured for assembling data packets into the right or ordered sequence.

In yet a further embodiment, in RTAQD 220, real time data dispatcher may be a software component or a hardware element or a combination thereof that may be configured for dispatching data in the queue into data sinks in an ordered manner or ordered sequence.

In one embodiment, with reference to FIG. 2A, RTAQD 220 may be used for processing unstructured audio and/or video data streams that are obtained from input devices 205 and/or ingestion system 210. In a further embodiment, RTAQD 220 may be configured to process the data, and RTAQD 220 may be further configured to provide the end-user with federated insights about the data that is collected.

In one embodiment, a real time video decoder, again which is part of RTAQD, may be a software component or a hardware element or a combination thereof that may be configured to decode the real time video packets into a proper image or/and audio format that may be used for downstream analytics or storage. In one embodiment, once the data is collected, which may be typically in real-time, the data may be correlated in real-time for example with data that is stored in a data lake or a repository. In a further embodiment, real-time online machine learning (ML) may be performed on the correlated data, and in yet a further embodiment real-time video content analytics may be performed on this correlated data. In an example embodiment, face detection using a preferred face detection algorithm may be performed in real time. In yet a further embodiment, for future querying of the data at a subsequent point in time, the data (faces detected) may be time-stamped automatically and the data, i.e. the time-stamped detected faces, may be archived into a repository (also referred to as a database).

In one embodiment, ingestion and/or aggregation from real-time data to Hadoop Distributed File System (HDFS), specifically for performing high volume analytics may be a scheduled mega-batch (large volume data) or micro-batch (small volume data) job. In an example embodiment, HDFS may be implemented using techniques such as those including an orchestration framework like Spring XD, an in-memory analytics engine like GemFire XD or an in-memory data streaming engine like Apache Spark Streaming, and not limited to these techniques, such that other techniques used to achieve similar results should fall within the scope of the present disclosure.

In one embodiment, tasks may be performed as a daily aggregation, or building/city/state/national level aggregation, and the choice in certain other embodiments may be determined by the user. In one embodiment a mixture of different choices may be used. With respect to the embodiments discussed in relation to the present disclosure, it should be noted that the frameworks and analytic engines are only exemplary in nature and various other frameworks and/or analytic engines available may be used to perform these tasks and achieve the same results, and all such frameworks and analytic engines should fall within the scope of this disclosure.

In one embodiment, considering HDFS, data may be first correlated, after which batch machine learning may be performed on the correlated data and finally post incident investigations may be performed within the given framework.

It may also be noted that an application such as a User Interface (UI) interfaced with the system may enable users to interact with the system, such as view dashboard insights, resource management, audit, reporting, visualization, geo-mapping, etc. Again, there may be numerous applications (UIs) capable of performing each of these tasks individually that may be combined to perform these tasks in a collective manner, or a single application may perform these functionalities, and also in some embodiments several available applications may be used to achieve these tasks and all such applications fall within the scope of the present disclosure.

Reference is again made to FIG. 2A, where in one embodiment, in-memory Real-Time Streaming Analytics (RTSA) 230 for unstructured video/audio data streams may be performed to obtain real-time insights. In one embodiment, real-time streaming analytics may also be comprised of real time data correlation, real time online machine learning and/or real time video analytics. In one example embodiment, RTSA correlation of structured data consists of real time analytics including low latency in-memory analytics engines such as Pivotal GemFire XD, Apache Spark, Apache Storm, Redis or Real-Time (RT) Computer Vision, which are exemplary in nature and other frameworks that can achieve the same results may be used and should fall within the scope of the present disclosure. In one embodiment, tasks such as object detection, object classification, anomaly detection, perimeter intrusion detection to name a few may be included, and there could be many other tasks defined by the user that are not mentioned herein, all such tasks should fall within the scope of the present disclosure. Advantageously, in one embodiment, it should be noted that RTSA may enable sequential algorithms such as object tracking. In an embodiment, RTSA may enable the sequential algorithms and online Machine Learning, such as Online LDA, Online GMM, Online Boosting, object tracking, etc. that may be computed in real time within in-memory analytics engine 230.

In one embodiment, the ML model may be updated adaptively and persisted into the database. In another embodiment, RT correlation with existing structured data sources like weather data, stock market, badge swipes, transaction log, and GIS data may be performed and subsequently RT visualization and mapping on this data may be achieved. In a further embodiment, a RT SQL interface may be enabled by an SQL engine such as SQL-Fire or Apache Spark SQL such that the data may be queried from a database. Other SQL engines may be used and these would fall under the scope of the present disclosure. The RT engines may also provide low latency, for example typically less than 500 microseconds compute time, fault-tolerance, elastic scalability, etc.

In one embodiment, for In-HDFS High Volume Analytics (HDFS) 240 also referred to as Batch Analytics in relation to unstructured video/audio data streams, as well as the correlation with structured data, the objective of the embodiment may be towards obtaining insights from a long-range of historical video archive. For example, in this embodiment, to achieve high volume analytics, Hadoop MapReduce may be used to extract structured insights from unstructured data, in particular for post-incident investigation, such as video summarization, and traffic pattern mining. MapReduce is known to be an industry proven technique for processing of big data. In this embodiment, MapReduce may be a relatively better tool for processing unstructured data, as compared to relational databases. In various embodiments, other tools similar to MapReduce may be used for processing unstructured data achieving the same results as desired under the present disclosure and all such tools will fall within the scope of the present disclosure.

In an additional embodiment, with reference to HDFS 240, a SQL interface may be enabled by relational databases such as Greenplum MPP database or SQL on Hadoop engines like Pivotal HAWQ, and other interfaces available to perform the same will fall within the scope of the present disclosure. In an exemplary embodiment the primary functions of Greenplum MPP may be a data warehouse utilizing a shared-nothing, massively parallel processing (MPP) architecture. In this embodiment, data may be partitioned across multiple segment servers, and each segment may own and may be configured to manage a distinct portion of the overall data. Further, in this embodiment, there may be no disk-level sharing nor data contention among segments, and Pivotal HAWQ may be the port of the Greenplum MPP Database that uses HDFS for its storage layer, and it may use the Greenplum DB query planner (adjusted for the environment) to handle query processing and may not rely on MapReduce under the hood to do processing, and also further has extensions to allow it to interact with data contained in other services (HBase, Hive, Avro, etc.) that also reside in HDFS.

In one embodiment, a Video Ingestion component may connect to the IP cameras, which have been networked suitably, and may collect information streams from the IP cameras. In this embodiment, the data stream that may comprise video data of different forms may be obtained as input from the IP cameras, such as real time surveillance data, but is not strictly limited to video data and other forms of data such as audio data may also be collected using the camera.

In one embodiment, for subsequent video data analytics, the video data may be transcoded video streams, which may be received from input devices (cameras), which may be in various different formats like MJPEG, H.264, ONVIF, etc., into certain analytics-ready format, for example a JPEG sequence file. In an optional embodiment, some lightweight pre-processing, such as corrupted video frame filtering and counting, may also be performed within this component. In a further embodiment, the transcoded video data may be ingested into two components: Fast In-Memory Video Processing (FIMVP) and Real-Time Streaming Video Processing (RTSVP). In yet a further embodiment, the raw video streams may also be archived in the HDFS Video Data Storage component.

In one embodiment, fast video processing may be performed in memory and further may be configured for processing fast-responsible computation use cases, for example high level analytics with SQL, deep analysis for model refinement and video data cleaning, on video data that is received from the video ingestion component with high data temperature and requiring micro-batch style processing. In an embodiment, the targeted turnaround time may typically be in the order of a minute scale. In another embodiment, the analyzed data will be evicted from memory and persisted to the HDFS Video Data Storage component when the temperature associated with the data drops, and the analytics results may be sent for analytics visualization so that end-users can navigate and investigate the data. In one embodiment, this may be achieved using a Web-based front end, application software, etc. that may be configured to visualize the information into consumable and actionable forms. For example, in one embodiment, a clustering algorithm may be applied to all year long car trajectories on a highway to get all similarly behaved car traffics into groups, for better understanding the civil traffic patterns.

In one embodiment, Real-Time Streaming video processing may also be performed in memory and may be further configured to handle video data in a stream processing style. In a further embodiment, the separation of real time streaming with fast video processing may be required because of the classification of in-memory video analytics use cases. In yet some embodiments, use cases may need data to be accumulated, cleaned and stored before processing, while in some other embodiments use cases may require lower latency or may be built atop events, thereby favoring stream-style processing. In such embodiments, the targeted turnaround time is required to be at the sub-second scale, and may be contrastingly different from fast video processing.

In one embodiment, former use cases may be handled better by the fast video processing, and latter use cases may be handled better by the real-time streaming video processing. In addition, analytics in the real-time streaming video processing may rely on models (jointly) that may be developed by the fast video processing and offline video processing. In one embodiment, real-time streaming video processing receives data from the ingestion system and after processing sends analytics results for analytics visualization.

In one embodiment, offline video processing may be enabled both by MapReduce computing and SQL ad-hoc computing, which take place after the video data is persisted by other components into HDFS Video Data Storage component 240. In a further embodiment, the persisted historical video data typically span long time periods and therefore these may be used to derive deep insights like trends, patterns and models for either front-end user navigation and investigation, or incremental refinement of fast and real-time processing in the memory. In yet a further embodiment, the data may be stored in a repository.

In one embodiment, HDFS Video Data Storage may be where raw video data and analytics results may be stored. In this embodiment, HDFS may be viewed as a file system protocol, which may be realized either with commodity hardware as in the original Hadoop system or by enterprise solutions such as EMC Isilon, ViPR and ECS. In other embodiments, other systems and solutions may also be used to achieve the results perceived in the present disclosure and all such solution and systems will fall within the scope of the present disclosure.

In one embodiment, management, user interface and analytics visualization may allow users to manage by providing the user option to make entries, operate and interact, such as features that include multiple camera monitoring display, charts for statistics and aggregation presentation (pie, line, map, etc.) and diagram overlays for use cases (e.g. display trajectory on the video picture, display abnormal point, etc.), which are only exemplary in nature and a number of techniques available to achieve management, user interface and analytics visualization will fall within the scope of the present disclosure.

Figure 3:
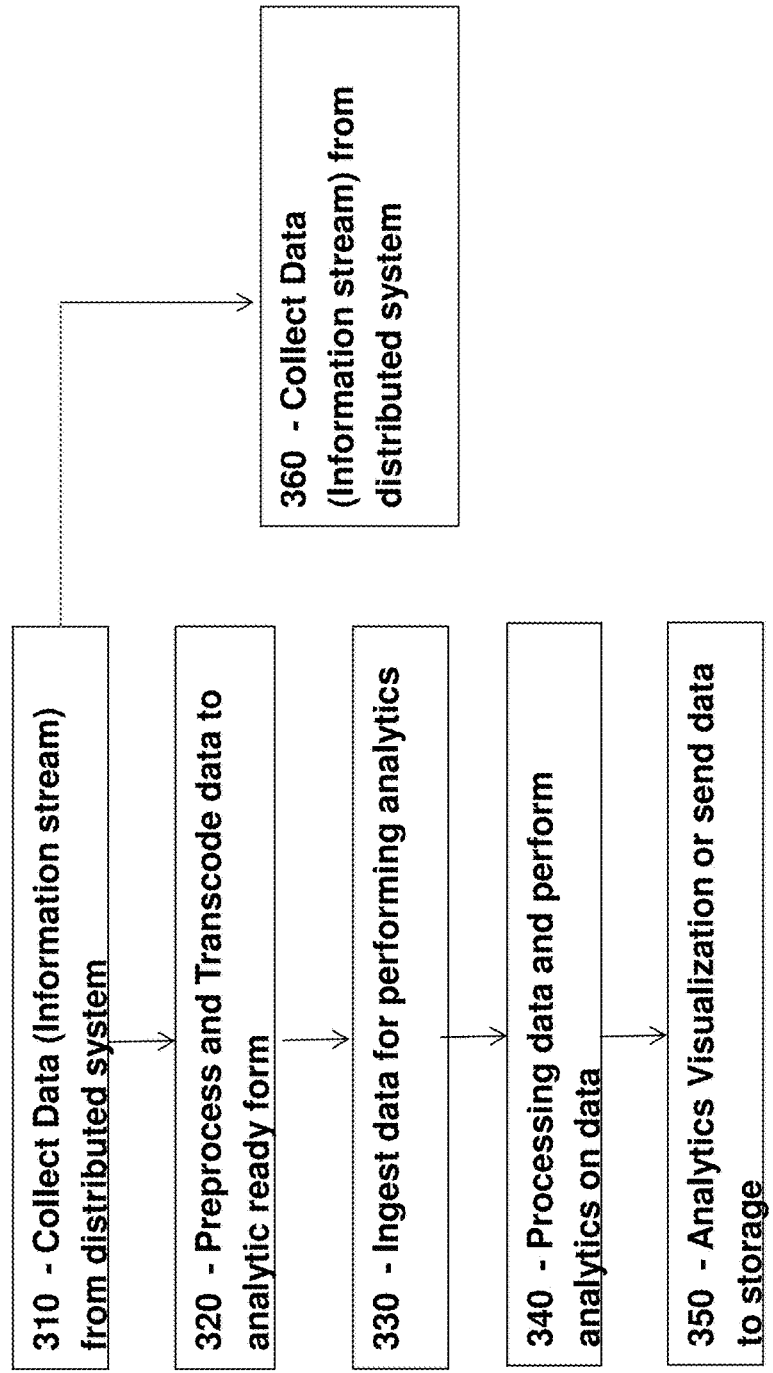
FIG. 3 illustrates an exemplary method in accordance with the embodiments of the present disclosure.

Reference is now made to FIG. 3, wherein in Step 310 the data or information stream is collected from an input device as disclosed previously with reference to FIG. 2A. Once data is collected, in Step 320 the collected data is preprocessed and transcoded to an analytic ready form, which is performed in the ingestion system as disclosed previously with reference to FIG. 2A and FIG. 2B. In Step 330 the data is ingested for performing analytics; ingestion and analytics has been disclosed previously with reference to FIG. 2A and FIG. 2B. In Step 320, the data is transcoded, for example transcoded to an analytic ready form, which has been disclosed with reference to FIG. 2A and FIG. 2B. Inside ingester node clusters, the video data will be transcoded, applying some basic real time analytics such as image enhancement, object detection, or other known techniques, and then ingested the data into the in-memory processing module.

In one embodiment, the data or information stream may be typically raw video signals such as image only, or image and audio mixed signals, or even signals with metadata from an onboard DSP chip, e.g. motion detection, collected from the cameras via a cluster of distributed ingestion systems in order to guarantee high availability and fault tolerance. In an example embodiment, if a particular ingestion system or node within the ingestion system fails in a cluster, the cluster may re-route the workload to other working nodes in the ingestion system in order to ensure that there may be no data loss in the process of collecting data. In one embodiment, after Step 310, the raw data may be stored in storage as in Step 360.

In Step 340, processing of the data and analytics on the data are performed as has been disclosed previously with reference to FIG. 2A. In Step 350, the data may be provided for visualization and/or may be sent to storage. The data on which analytics is performed may be stored in a data storage repository for future use. In one embodiment, the real time data may be combined with data from a repository before being ingested.

In one embodiment, in-memory processing may be a distributed cluster of computing nodes that may be capable of fast read/write into the memory, which may be advantageously included. In yet another embodiment, analytics such as correlations of video data with other structured data such as weather, badge swiping, etc. may be enabled or performed on the data in real time. In yet another embodiment, adaptive machine learning may be enabled with in-memory model parameter updating.

In one embodiment, in-memory processing may only hold "hot data." In various embodiments, "hot data" may include data that may be relatively fresh, such as recently collected data that may be about one hour or less old. After that, the "compaction" module may be configured to consolidate the old data automatically and persist into large scale storage system such as Hadoop Distributed File System (HDFS) on a regular basis as may be determined by the user or as may be pre-set, for example on an hourly basis. This mechanism ensures that memory may be always put into the best use to serve the real time analytics, and results in minimal waste of memory.

In one embodiment, once the data reaches the HDFS, Big Data techniques such as MapReduce may be applied to analyze large quantity of data such as on a Petabyte scale. This enables post-incident investigation, which usually may not need to be in real time, while there may still be a need to scan through large quantities of data.

Accordingly, the system shown in FIG. 1 and FIG. 2A may be implemented in various manners. For example, in some embodiments, the system may be implemented using software and/or firmware completely or partially, for example, implemented as a computer program product embodied in a computer readable medium or purely as software or purely in terms of hardware or a combination thereof. Alternatively, or additionally, the system may be implemented based on hardware partially or completely, for example, implemented as integrated circuit (IC), application-specific integrated chip (ASIC), system on chip (SOC), field programmable gate array (FPGA), etc. The scope of the present disclosure is not limited in this regard.

As will be appreciated by one skilled in the art, aspects/embodiments of the present disclosure may be embodied as a system, method or computer program product. Accordingly, aspects/embodiments of the present disclosure may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects/embodiments of the present disclosure may take the form of a computer program product embodied in one or more computer readable medium(s) having computer readable program code embodied thereon.

Any combination of one or more computer readable medium(s) may be utilized. The computer readable medium may be a computer readable program code or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 1, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 1, which may have Program Logic embodied on a computer-readable medium as shown, and wherein the Logic is encoded in computer-executable code configured for carrying out the reservation service process of this invention and thereby forming a Computer Program Product.

Program code embodied on a computer readable medium may be transmitted using any appropriate medium, including but not limited to wireless, wireline, optical fiber cable, RF, etc., or any suitable combination of the foregoing.

The logic for carrying out the method may be embodied as part of the system described below, which is useful for carrying out a method described with reference to embodiments shown in, for example, FIG. 3. For purposes of illustrating the present disclosure, the disclosure is described as embodied in a specific configuration and using special logical arrangements, but one skilled in the art will appreciate that the device is not limited to the specific configuration but rather only by the claims included with this specification.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects/embodiments of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A method for performing video analytics on content, the method comprising collecting, by a video ingestion system, content comprising video data from a plurality of sources, wherein the content is provided in accordance with a streaming protocol, wherein the video ingestion system comprises a collector that collects the content, a processor, an ingester, and an ingestion manager that controls functioning of the collector, the processor and the ingester;

storing the content in a local repository on a server for downtime recording in the event of a negative determination of a network connection, wherein the server is directly coupled to at least one of the plurality of sources, wherein the server is configured to cache content until the network connection retains normalcy; and performing, with logic associated with the processor, analytics including at least one of a real-time insight, an interactive insight or a batch insight on the content, and displaying to a user at least one resulting insight wherein the at least one resulting insight is in a human readable form, wherein the ingestion manager transmits the content from the collector to the processor for processing, and wherein the content is then transmitted to the ingester for further processing;

wherein performing analytics includes detecting one or more anomalies in the content in at least one of an offline mode or an online mode by comparing the content with at least one of stored content in other repositories or real-time streaming content, the one or more anomalies being represented in the at least one resulting insight displayed to the user;

wherein performing analytics further includes comparing similar content, obtained through the other repositories via a worldwide network, with the content collected to assist in detecting the one or more anomalies; and wherein the at least one of stored content in other repositories or real-time streaming content originates from a different source than the content in which the one or more anomalies is being detected.

2. The method as claimed in claim 1, further comprising: classifying and segregating the content collected from the plurality of sources into being at least one of a real time source or a batch source, wherein the segregation involves arranging the content collected based on a set of pre-defined rules or user defined rules.

3. The method as claimed in claim 1, further comprises: processing, using video analytics, the content collected based on a segregated category to obtain processed content.

4. The method as claimed in claim 1, wherein the content collected originates from at least one of a real time streaming source, a file format source or a third party data source.

5. The method as claimed in claim 3, wherein the processing using video analytics is performed at least in one of a computer memory for real time analytics or in a file system repository for large scale big data analytics.

6. The method as claimed in claim 1, wherein performing analytics further comprises:
performing a match of the similar content obtained from the other repositories with the content collected; and
providing the user with a ranked list of results matching the content collected.

7. The method as claimed in claim 1, wherein performing analytics further comprises performing at least one of:
detection, recognition, indexing, summarization, retrieval or matching biometrics for the content collected with a sample content;
compressing the content collected;
generating areas of interest in the content collected; and
detecting relevant details with respect to the sample content.

8. A system for performing video analytics on content, the system comprising at least a memory and a processor, configured for:
collecting, by a video ingestion system, content comprising video data from a plurality of sources, wherein the content is provided in accordance with a streaming protocol, wherein the video ingestion system comprises a collector that collects the content, a processor, an ingester, and an ingestion manager that controls functioning of the collector, the processor and the ingester;
storing the content in a local repository on a server for downtime recording in the event of a negative determination of a network connection, wherein the server is directly coupled to at least one of the plurality of sources, wherein the server is configured to cache content until the network connection retains normalcy; and
performing, with logic associated with the processor, analytics including at least one of a real-time insight, an interactive insight or a batch insight on the content, and displaying to a user at least one resulting insight wherein the at least one resulting insight is in a human readable form, wherein the ingestion manager transmits the content from the collector to the processor for processing, and wherein the content is then transmitted to the ingester for further processing;
wherein performing analytics includes detecting one or more anomalies in the content in at least one of an offline mode or an online mode by comparing the content with at least one of stored content in other repositories or real-time streaming content, the one or more anomalies being represented in the at least one resulting insight displayed to the user;
wherein performing analytics further includes comparing similar content, obtained through the other repositories via a worldwide network, with the content collected to assist in detecting the one or more anomalies; and
wherein the at least one of stored content in other repositories or real-time streaming content originates from a different source than the content in which the one or more anomalies is being detected.

9. The system as claimed in claim 8, further comprising: classifying and segregating the content collected from the plurality of sources into being at least one of a real time source or a batch source, wherein the segregation involves arranging the content collected based on a set of pre-defined rules or user defined rules.

10. The system as claimed in claim 8, further comprising: processing using video analytics the content collected based on a segregated category to obtain processed content.

11. The system as claimed in claim 8, wherein the content collected originates from at least one of a real time streaming source or a file format source or a third party data source.

12. The system as claimed in claim 10, wherein the processing using video analytics is performed at least in one of a computer memory for real time analytics or in a file system repository for large scale big data analytics.

13. The system as claimed in claim 8, wherein performing analytics further comprises:
performing a match of the similar content obtained from the other repositories with the content collected; and
providing the user with a ranked list of results matching the content collected.

14. The system as claimed in claim 8, wherein performing analytics further comprises:
performing at least one of detection, recognition, indexing, summarization, retrieval or matching biometrics for the content collected with a sample content;
compressing the content collected;
generating areas of interest in the content collected; and
detecting relevant details with respect to the sample content.

15. A computer program product for performing video analytics on content, the computer program product being tangibly stored in a non-transient computer readable medium and including machine executable instructions, the machine executable instructions, when being executed, configured to enable the execution of:
collecting, by a video ingestion system, content comprising video data from a plurality of sources, wherein the content is provided in accordance with a streaming protocol, wherein the video ingestion system comprises a collector that collects the content, a processor, an ingester, and an ingestion manager that controls functioning of the collector, the processor and the ingester, wherein the content collected originates from at least one of a real time streaming source, a file format source or a third party data source;
storing the content in a local repository on a server for downtime recording in the event of a negative determination of a network connection, wherein the server is directly coupled to at least one of the plurality of sources, wherein the server is configured to cache content until the network connection retains normalcy; and
performing analytics including at least one of a real-time insight, an interactive insight or a batch insight on the content, and displaying to a user at least one resulting insight wherein the at least one resulting insight is in a human readable form, wherein the ingestion manager transmits the content from the collector to the processor for processing, and wherein the content is then transmitted to the ingester for further processing;

wherein performing analytics includes detecting one or more anomalies in the content in at least one of an offline mode or an online mode by comparing the content with at least one of the stored content in other repositories or real-time streaming content, the one or more anomalies being represented in the at least one resulting insight displayed to the user;

wherein performing analytics further includes comparing similar content, obtained through the other repositories via a worldwide network, with the content collected to assist in detecting the one or more anomalies; and wherein the at least one of stored content in other repositories or real-time streaming content originates from a different source than the content in which the one or more anomalies is being detected.

16. The computer program product as claimed in claim 15, further comprising:

classifying and segregating the content collected from the plurality of sources into being at least one of a real time source or a batch source, wherein the segregation involves arranging the content collected based on a set of pre-defined rules or user defined rules; and processing using video analytics the content collected based on the segregated category to obtain processed content;

wherein the processing using video analytics is performed at least in one of a computer memory for real time analytics or in a file system repository for large scale big data analytics.

17. The computer program product as claimed in claim 15, wherein performing analytics further comprises:

performing a match of the similar content obtained from the other repositories with the content collected; and providing the user with a ranked list of results matching the content collected.

18. The computer program product as claimed in claim 15, wherein performing at least one of detection, recognition, indexing, summarization, retrieval or matching biometrics for the content collected with a sample content;

compressing the content collected;

generating areas of interest in the content collected; and detecting relevant details with respect to the sample content.

19. The method as claimed in claim 1, including storing, by use of a compaction module, the content in the local repository after a predetermined period of time has passed subsequent to collecting the content.

20. The system as claimed in claim 8, wherein the processor is configured to coordinate a compaction module to store the content in the local repository after a predetermined period of time has passed subsequent to collecting the content.

21. The computer program product as claimed in claim 15, wherein the machine executable instructions are configured to coordinate a compaction module to store the content in the local repository after a predetermined period of time has passed subsequent to collecting the content.

* * * * *